US012644329B2

(12) United States Patent
Frick et al.

(10) Patent No.: US 12,644,329 B2
(45) Date of Patent: *Jun. 2, 2026

(54) BARRIER PASSAGE SYSTEM FOR AUTONOMOUS WORKING MACHINE

(71) Applicant: THE TORO COMPANY, Bloomington, MN (US)

(72) Inventors: Alexander Steven Frick, Farmington, MN (US); Peter M. Arendt, Richfield, MN (US); Aaron Y. Curtis, Eagan, MN (US)

(73) Assignee: THE TORO COMPANY, Bloomington, MN (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/739,810

(22) Filed: Jun. 11, 2024

(65) Prior Publication Data

US 2024/0328237 A1 Oct. 3, 2024

Related U.S. Application Data

(63) Continuation of application No. 17/437,582, filed as application No. PCT/US2020/024136 on Mar. 23, 2020, now Pat. No. 12,044,056.

(Continued)

(51) Int. Cl.
*E05F 15/77* (2015.01)
*A01D 34/00* (2006.01)
(Continued)

(52) U.S. Cl.
CPC ............ *E05F 15/77* (2015.01); *A01D 34/008* (2013.01); *E05B 47/0001* (2013.01);
(Continued)

(58) Field of Classification Search
CPC ......... E05F 15/77; E05F 15/627; E05F 15/73; E05F 15/616; A01D 34/008;
(Continued)

(56) References Cited

U.S. PATENT DOCUMENTS 10,159,181 B2 12/2018 Crandall et al.
10,767,383 B2 9/2020 Crandall et al.
(Continued)

FOREIGN PATENT DOCUMENTS

DE 202012104646 U1 1/2013
ES 2013058 A6 4/1990

OTHER PUBLICATIONS

Australian Examination Report issued Jul. 1, 2025; AU Patent Application No. 2024201982; 3 pages.
(Continued)

*Primary Examiner* — Jelani A Smith
*Assistant Examiner* — Paul A Castro
(74) *Attorney, Agent, or Firm* — Mueting Raasch Group

(57) ABSTRACT

A system for use with an autonomous working machine such as a robotic lawn mower. The system may allow communication (directly or indirectly) between the machine and a gate or other barrier opening to allow unattended or remotely-controlled passage of the machine through the gate. In some embodiments, the mower may include a vision system operable to detect unknown objects within an area adjacent to the gate.

10 Claims, 8 Drawing Sheets

Related U.S. Application Data

(60) Provisional application No. 62/889,216, filed on Aug. 20, 2019, provisional application No. 62/829,777, filed on Apr. 5, 2019.

(51) Int. Cl.

| | |
|---|---|
| *E05B 47/00* | (2006.01) |
| *E05F 15/627* | (2015.01) |
| *E05F 15/73* | (2015.01) |
| *G05D 1/00* | (2006.01) |
| *G05D 1/646* | (2024.01) |
| *G07C 9/10* | (2020.01) |
| *A01D 101/00* | (2006.01) |

(52) U.S. Cl.
CPC ............ *E05F 15/627* (2015.01); *E05F 15/73* (2015.01); *G05D 1/0212* (2013.01); *G05D 1/646* (2024.01); *G07C 9/10* (2020.01); *A01D 2101/00* (2013.01); *E05B 2047/0016* (2013.01); *E05Y 2201/434* (2013.01); *E05Y 2201/654* (2013.01); *E05Y 2400/40* (2013.01); *E05Y 2400/53* (2013.01); *E05Y 2400/61* (2013.01); *E05Y 2400/664* (2013.01); *E05Y 2800/10* (2013.01); *E05Y 2900/40* (2013.01)

(58) Field of Classification Search
CPC ............ A01D 2101/00; E05B 47/0001; E05B 2047/0016; E05B 53/003; G05D 1/0212; G05D 1/646; G07C 9/10; E05Y 2201/434; E05Y 2201/654; E05Y 2400/40; E05Y 2400/53; E05Y 2400/61; E05Y 2400/664; E05Y 2800/10; E05Y 2900/40; E05C 1/004; E05C 1/08; E06B 11/02

See application file for complete search history.

(56) References Cited

U.S. PATENT DOCUMENTS

| | | | |
|---|---|---|---|
| 12,044,056 | B2 | 7/2024 | Frick et al. |
| 2005/0126081 | A1 | 6/2005 | Patel et al. |
| 2005/0252622 | A1 | 11/2005 | Reid |
| 2010/0319258 | A1 | 12/2010 | Betker |
| 2014/0225433 | A1 | 8/2014 | Niizuma |
| 2016/0186485 | A1 | 6/2016 | Taylor |
| 2017/0212518 | A1 | 7/2017 | Iimura et al. |
| 2018/0329410 | A1* | 11/2018 | Schuler .................. E05F 15/77 |
| 2018/0368312 | A1 | 12/2018 | Strang |
| 2019/0136563 | A1 | 5/2019 | Crandall et al. |
| 2019/0235521 | A1 | 8/2019 | Mudalige et al. |
| 2022/0145691 | A1 | 5/2022 | Frick et al. |

OTHER PUBLICATIONS

International Search Report and Written Opinion for PCT/US2020/024136 dated Jun. 26, 2020, 14 pages.
International Preliminary Report on Patentability for PCT/US2020/024136 dated Jul. 12, 2021, 20 pages.
Written Opinion of the International Preliminary Examining Authority for PCT/US2020/024136 dated Feb. 22, 2021, 6 pages.
Written Opinion of the International Preliminary Examining Authority for PCT/US2020/024136 dated May 18, 2021, 8 pages.
Extended European Search Report in EP23174794.0, dated Aug. 30, 2023, 6 pages.

* cited by examiner

BARRIER PASSAGE SYSTEM FOR AUTONOMOUS WORKING MACHINE

The present application is a continuation of U.S. patent application Ser. No. 17/437,582, filed Sep. 9, 2021, which is a 35 U.S.C. § 371 U.S. National Stage of International Application No. PCT/US2020/024136, filed Mar. 23, 2020, which claims priority to and/or the benefit of U.S. Provisional Patent Application No. 62/889,216, filed 20 Aug. 2019, and U.S. Provisional Patent Application No. 62/829, 777, filed 5 Apr. 2019, wherein each of the patent documents listed in this paragraph is incorporated herein by reference in its entirety Embodiments of the present disclosure relate to autonomous working machines such as robotic lawn mowers and, more particularly to systems for remotely or autonomously permitting the machine to pass through a physical property barrier such as a fence or wall.

BACKGROUND

Lawn and garden vehicles are known for performing a variety of tasks. For instance, powered lawn mowers are used by both homeowners and professionals alike to maintain turf areas within a property.

Robotic mowers that autonomously perform a grass cutting function are also known. Autonomous mowers typically include a cutter housing having a cutting member or blade. A battery-powered electric motor is generally included to power both the cutting blade as well as a propulsion system. Depending on the property size, the mower may cut only a portion of the property before returning to a base station for battery re-charging.

SUMMARY

Many properties include property barriers such as buildings, fences, and even elevational changes (e.g., terraces) that may interfere with free movement of the working machine/mower from one area of the property to another (or with exiting from or entry into a garage or other building of the property). Systems in accordance with embodiments of the present disclosure may provide autonomous working machines, systems, and methods for permitting passage of the machine through such property barrier. In some embodiments, barrier passage systems may utilize, at least in part, machine vision systems incorporated into the working machine. For example, the barrier passage system may use vision sensors associated with autonomous navigation of the machine about a work area of the property during operation. In other embodiments, however, the barrier passage system may be independent of vision and/or other machine systems.

According to a first aspect of the present disclosure, a barrier passage system permitting an autonomous working machine to cross a property barrier is provided. The system includes some or all of: a gate associated with the property barrier, the gate selectively movable between a closed position, wherein a gate opening through the property barrier is blocked by the gate, and an open position, wherein passage of the working machine through the gate opening is permitted; an actuator adapted to move the gate between the closed position and the open position; a gate controller adapted to selectively energize the actuator, the gate controller comprising a wireless receiver; and a machine controller associated with the working machine and adapted to autonomously control navigation of the working machine within a property divided by the property barrier, wherein the machine controller is configured to transmit a gate open signal to the wireless receiver requesting movement of the working machine through the gate opening, and wherein upon receipt of the gate open signal the gate controller commands the actuator to move the gate from the closed position to the open position.

In a second aspect according to the first aspect, the actuator and the gate controller are directly connected to either an alternating current source or a direct current source. In a third aspect according to the first aspect, the actuator and the gate controller are adapted to receive electrical power from the working machine. In a fourth aspect according to any one of the preceding aspects, the actuator comprises a linear actuator. In a fifth aspect according to any one of the first-fourth aspects, the actuator comprises a rotary actuator. In a sixth aspect according to the fifth aspect, the actuator is coupled to an actuator cable extended through an offset cable guide, wherein the actuator cable is adapted to pivot the gate between the closed position and the open position. In a seventh aspect according to the fifth aspect, the barrier passage system further comprises a gate latch, wherein the actuator is coupled to a retractable pin of the gate latch. In an eighth aspect according to any one of the previous aspects, the gate includes a turntable formed by a floor segment and two upwardly extending walls. In a ninth aspect according to any one of the preceding aspects, the barrier passage system further includes a camera associated with the working machine, the camera operatively coupled to the machine controller.

An independent tenth aspect includes a method for controlling operation of an autonomous working machine through a gate opening formed through a property barrier, the gate opening selectively blocked by a gate. The method includes some or all of: approaching a first side of the gate with the working machine, the working machine comprising a machine controller adapted to autonomously control navigation of the working machine as the working machine traverses a property containing the property barrier; wirelessly transmitting a gate open signal from the machine controller to a gate controller associated with the gate; commanding, via the gate controller, an actuator connected to the gate to move the gate from a closed position, wherein passage of the working machine through the property barrier is blocked, to an open position, wherein passage of the working machine through the gate opening is permitted; and autonomously propelling the working machine through the gate opening under control of the machine controller.

In an eleventh aspect according to the tenth aspect, the method further includes returning the gate, via the gate controller and the actuator, to the closed position after expiration of a predetermined period of time. In a twelfth aspect according the tenth aspect, the method further includes wireless transmitting a gate close signal from the machine controller to the gate controller after the working machine has passed through the gate opening. In a thirteenth aspect according to any one of the tenth-twelfth aspects, the method further includes any one or more of: monitoring an area adjacent to the gate with a camera operatively communicating with the machine controller; detecting an unknown object within the area adjacent to the gate using the camera and machine controller; and delaying movement of the gate to the open position based upon a detected presence of the unknown object.

An independent fourteenth aspect includes a method for controlling operation of an autonomous working machine through a gate opening formed through a property barrier, the gate opening selectively blocked by a gate. The method includes some or all of: approaching a first side of the gate with the working machine; wirelessly transmitting a gate open signal from the machine controller to a gate controller associated with the gate; commanding, via the gate controller, an actuator connected to the gate to move the gate from a closed position, wherein passage of the working machine through the gate opening of the property barrier is blocked, to an open position, wherein passage of the working machine through the gate opening of the property barrier is permitted; and autonomously propelling the working machine through the gate opening under control of the machine controller. In this fourteenth embodiment, the working machine may include: a machine controller adapted to autonomously control navigation of the working machine as the working machine traverses a property containing the property barrier; and two or more cameras carried by the working machine and in communication with the machine controller.

A more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
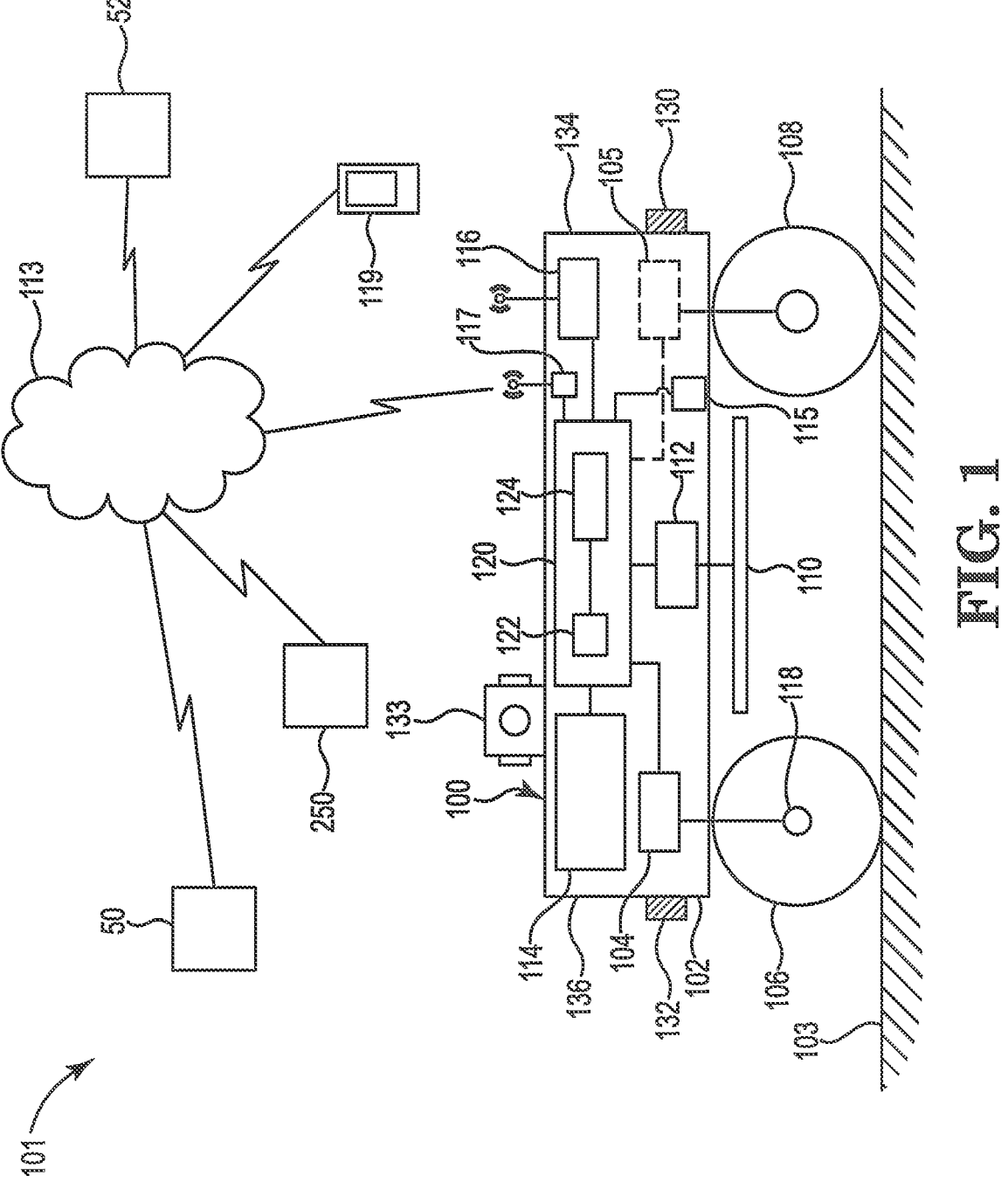
FIG. 1 is a diagrammatic side view of an autonomous working machine (e.g., ground working machine such as a robotic lawn mower) for use with a barrier passage system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing that form a part hereof. It is to be understood that other embodiments, which may not be described and/or illustrated herein, are certainly contemplated.

Headings provided herein are for the convenience of the reader and should not be used to limit the meaning of any text that follows the heading, unless so specified. Moreover, unless otherwise indicated, numbers expressing quantities, and terms expressing direction/orientation (e.g., vertical, horizontal, parallel, perpendicular, etc.) in the specification and claims are to be understood as being modified by the term "about." The term "and/or" (if used) means one or all of the listed elements or a combination of any two or more of the listed elements. "I.e." is used as an abbreviation for the Latin phrase id est and means "that is." "E.g." is used as an abbreviation for the Latin phrase exempli gratia and means "for example."

Embodiments of the present disclosure provide autonomous machines, methods, and systems that permit autonomous functioning of the machine within a work region. Barrier passage systems and methods like those described herein permit the machine to autonomously pass (or be remotely-controlled) through (or over/under) a property barrier such as a fence or wall located in or near the work region. While the examples described herein illustrate the exemplary property barrier as a fence or wall, the terms "barrier" and "property barrier" may be used herein to refer to other obstacles (buildings, terraces, etc.) that divide a property. These exemplary barrier passage systems may permit a machine to move between different portions of a yard (e.g., move between different areas of a yard or different elevations of a tiered yard).

In some embodiments, the autonomous machine may learn and subsequently recognize a boundary of the work region using an onboard machine vision system and, optionally, other non-vision-based sensors. The vision system may utilize one or more cameras that together form part of a navigation system as described more fully in U.S. Prov. Pat. App. No. 62/818,893 entitled AUTONOMOUS MACHINE NAVIGATION USING VISION SYSTEM, filed 15 Mar. 2019.

While described as an autonomous mower, such a configuration is illustrative only as systems and methods described herein also have application to other autonomous working machines including, for example, commercial mowing products, other outdoor working machines or vehicles (e.g., debris blowers/vacuums, aerators, dethatchers, material spreaders, snow throwers, weeding machines for weed remediation mobile watering/treating vehicles), indoor working vehicles such as vacuums and floor scrubbers/cleaners (e.g., that may encounter obstacles), construction and utility vehicles (e.g., trenchers), observation vehicles, and load transportation vehicles (e.g., for hauling equipment or people). Furthermore, autonomous machines described herein may employ various types of navigation, such as random, modified random, or specific path planning, to carry out their intended functionality.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the referenced figure, or while the machine (e.g., mower 100) is in an operating configuration (e.g., while the machine is positioned such that wheels 106 and 108 rest upon a generally horizontal ground surface 103 as shown in FIG. 1). These terms are used to simplify the description, however, and not to limit the interpretation of any embodiment described. Further, the terms "determine" and "estimate" may be used interchangeably herein.

Figure 3:
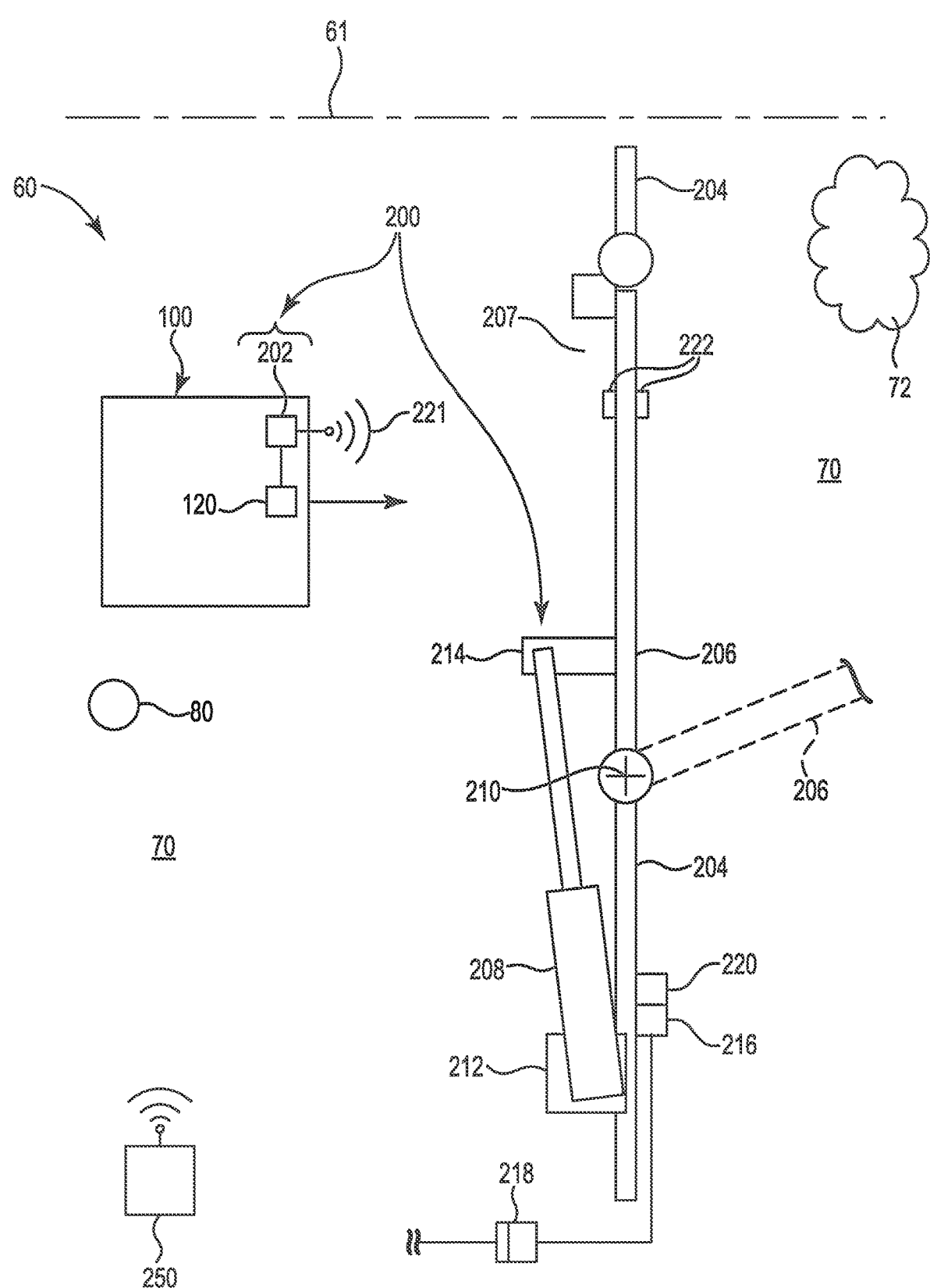
FIG. 3 is a top view of a barrier passage system in accordance with embodiments of the present disclosure, the system adapted to allow the autonomous working machine to pass through a gated opening of a yard fence.

As used herein, "property" is defined as a geographic region (such as a yard) circumscribed by a fixed boundary within which the machine 100 may perform work (e.g., mow grass). For example, FIG. 3 illustrates an exemplary property or yard 60 defined by a boundary 61 (boundary only partially illustrated). "Work region" (see, e.g., work region 70 in FIG. 3) is used herein to refer to those areas contained (or mostly contained) within the boundary 61 within which the vehicle will perform work. For example, work regions could be defined by grass surfaces of the property or yard 60 upon which the autonomous lawn mower will perform its maintenance function (e.g., cut grass). A property may contain one or more work regions including, for example, a front-yard area and a back-yard area, or two yard areas separated by a fence (see, e.g., fence 204 in FIG. 3). "Exclusion zone" is defined herein as an area contained within the property/work region in which the machine is not intended to perform its intended maintenance task (e.g., not intended to mow grass). Examples of exclusion zones include landscaped or garden areas such as area 72 shown in FIG. 3, buildings, sidewalks, driveways, and other yard features. "Transit zones" may be used herein to refer to paths through exclusion zones that the machine may take when travelling between different work regions of the property. Typically, the machine will not perform a maintenance task (mowing) when moving through a transit zone.

While the construction of the actual working machine is not necessarily central to an understanding of embodiments of this disclosure, FIG. 1 schematically illustrates an exemplary autonomous working machine configured as an autonomous lawn mower 100 (also referred to herein as "machine" or "robot"), which forms part of a lawn mowing system that may include other components such as a charging station 50. As shown in FIG. 1, the mower 100 may include a housing 102 (e.g., frame or chassis with a shroud) that carries and/or encloses various components of the mower as described below. The mower 100 may further include ground support members, such as wheels, rollers, skids, or tracks. In the illustrated embodiment, the ground support members include one or more rear wheels 106 and one or more front wheels 108, that support the housing 102 upon the ground (grass) surface 103. As illustrated, the front wheels 108 are used to support a front-end portion 134 of the housing 102 and the rear wheels 106 are used to support a rear-end portion 136 of the mower housing.

One or both rear wheels 106 may be driven by a propulsion system (e.g., including one or more wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. That is to say, the propulsion system may include a separate wheel motor 104 for each of a left and right rear wheel 106 (see FIG. 2) so that speed and direction of each rear wheel may be independently controlled. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

An implement or tool (e.g., a grass cutting element, such as a blade 110) may be coupled to a cutting motor 112 carried by the housing 102. When the motors 112 and 104 are energized, the mower 100 may be propelled over the ground surface 103 such that vegetation (e.g., grass) over which the mower passes is cut by the rotating blade 110. While illustrated herein using only a single blade 110 and/or cutting motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power is provided by a single motor are also contemplated.

The mower 100 may further include one or more sensors to provide location data. For instance, some embodiments may include a global positioning system (GPS) receiver 116 (or other position sensor that may provide similar data) that is adapted to estimate a position of the mower 100 within the work region and provide such information to an electronic machine controller 120 (described below) associated with the working machine (mower 100) that, among other uses, is adapted to autonomously control navigation of the machine as the machine traverses the property/work region divided by or otherwise containing the property barrier. In other embodiments, one or more of the wheels 106, 108 may include encoders 118 that provide wheel rotation/speed information (odometry) that may be used to estimate mower position (e.g., based upon an initial start position) within a given work region. The mower 100 may also include a sensor 115 adapted to detect a boundary wire, which could be used in addition to vision-based navigational techniques.

The mower 100 may optionally include one or more front obstacle detection ("bump") sensors 130 and one or more rear obstacle detection sensors 132, as well as other sensors, such as side obstacle detection sensors (not shown). The obstacle detection sensors 130, 132 may be used to detect an obstacle in the path of the mower 100 when travelling in a forward or reverse direction, respectively (the mower 100 may be capable of mowing while moving in both forward and reverse directions). As illustrated, the sensors 130, 132 may be located at the front-end portion 134 and rear-end portion 136 of the mower 100, respectively. In addition to the sensors described, other sensors now known or later developed may also be incorporated into the mower 100.

The mower 100 may carry or otherwise include one or more vision-based sensors to provide localization data, such as position, orientation, and/or velocity. The vision-based sensors may include two or more cameras 133 carried by the working machine (mower) and operatively coupled or otherwise in communication with the machine controller 120 that capture or record digital image data for use with a vision system associated with the machine controller 120. That is, the cameras 133 may be described as part of the vision system of the mower 100. Types of image data include, for example, training image data and/or operational image data.

The one or more cameras may be capable of detecting visible light, non-visible light, or both. The one or more cameras may establish a total field of view of at least 30 degrees, at least 45 degrees, at least 60 degrees, at least 90 degrees, at least 120 degrees, at least 180 degrees, at least 270 degrees, or even 360 degrees, around the autonomous machine (e.g., mower 100). The field of view may be defined in a horizontal direction, a vertical direction, or both directions. For example, a total horizontal field of view may be 360 degrees, and a total vertical field of view may be 45 degrees. The field of view may capture image data above and below the height of the one or more cameras.

Figure 2:
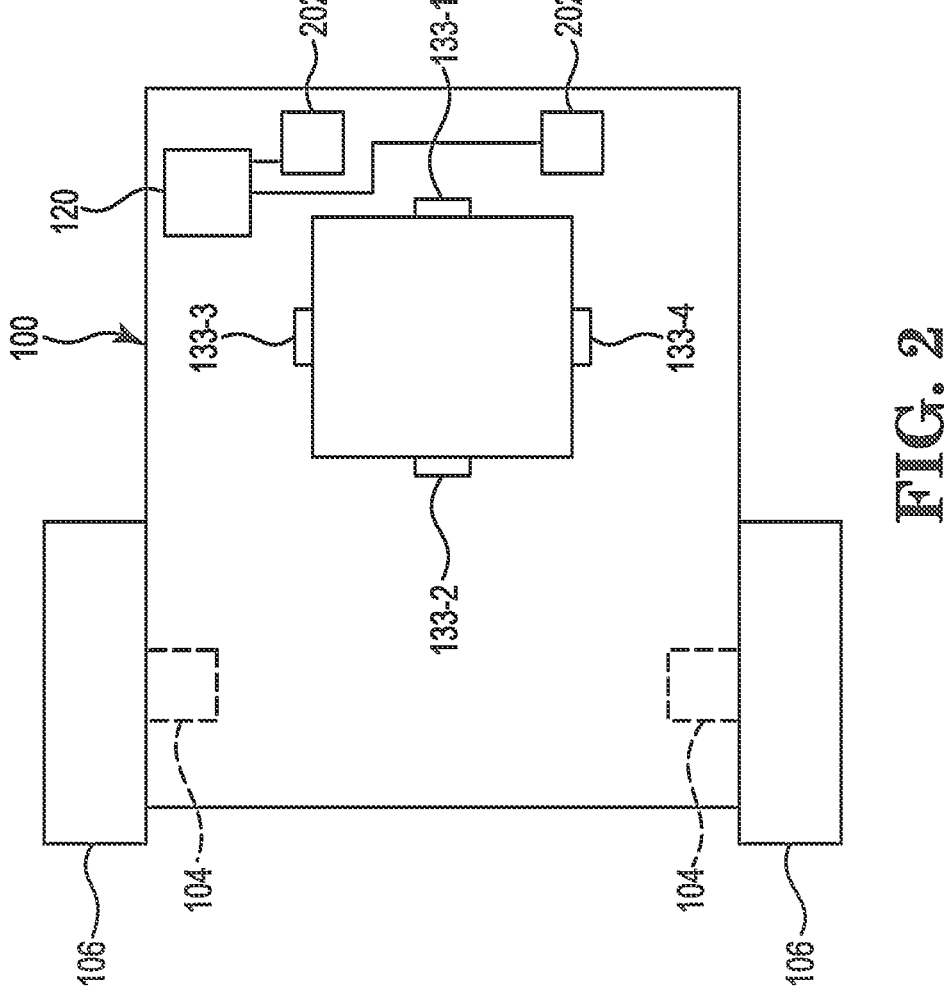
FIG. 2 is a diagrammatic top view of the machine of FIG. 1.

In some embodiments, the mower 100 includes four cameras 133 (e.g., cameras 133-1, 133-2, 133-3, and 133-4; collectively and individually referred to as camera or cameras 133) as shown in FIG. 2. One camera 133 may be positioned in each of one or more directions including a forward direction (camera 133-1), a reverse direction (camera 133-2), a first (e.g., left) side direction (camera 133-3), and a second (e.g., right) side direction (camera 133-4), thereby forming Cardinal directions relative to the mower 100. One or more camera directions may be positioned orthogonal to one or more other cameras 133 or positioned opposite to at least one other camera 133. Although not shown, the cameras 133 may also be offset from any of these directions (e.g., at a 45 degree or another non-right angle).

The mower 100 may also include the machine controller 120 (see FIG. 1) adapted to monitor and control various mower functions. The machine controller 120 may include a processor 122 that receives various inputs and executes one or more computer programs or applications stored in memory 124. The memory 124 may include computer-readable instructions or applications that, when executed, e.g., by the processor 122, cause the machine controller 120 to perform various calculations and/or issue commands. That is to say, the processor 122 and memory 124 may together define a computing apparatus operable to process input data and generate the desired output to one or more components/devices. For example, the processor 122 may receive various input data including positional data from the GPS receiver 116 and/or wheel encoders 118 and generate speed and steering angle commands to the wheel motor(s) 104 to cause the rear wheels 106 to rotate (at the same or different speeds and in the same or different directions). In other words, the machine controller 120 may control the steering angle and speed of the mower 100, as well as the speed and operation of the cutting blade 110.

Reference herein may be made to various parameters, data, or data structures, which may be handled in the machine controller 120, for example, by being processed by the processor 122 or stored in or retrieved from the memory 124. The machine controller 120 may use the processor 122 and memory 124 in different systems. Alternatively, one or more processors 122 and memory 124 may be included in each different system. In some embodiments, the machine controller 120 may form part of a vision system, which may include a processor 122 and memory 124. The machine controller 120 may also at least partially define a navigation system, which may also include a processor 122 and memory 124 the same or separate from the processor 122 and memory 124 of the vision system. In general, as used herein, the term "controller" may be used to describe components of a system that receive inputs and provide outputs and commands to control various other components of a system.

A communication system 101 may be provided to permit the mower 100/machine controller 120 to operatively communicate (e.g., via a wireless radio 117) with a communication network that may include a wireless network 113, thereby allowing communication (e.g., bidirectional communication) between the mower and other devices. For example, the wireless network 113 may be a cellular or other wide area network, a local area network (e.g., Institute of Electrical and Electronics Engineers (IEEE) 802.11 local "Wi-Fi" network), or a personal area or peer-to-peer network ("P2P," e.g., "Bluetooth" network). Other devices may communicate over the wireless network with the mower 100, including, for example, a remote computer 119, which may be configured as a cellular phone, tablet, desktop computer, notebook computer, or wearable computer. Preferably, the wireless network 113 is connected to the internet so that the user/remote computer 119 may interact with the communication system 101 regardless of the user's location. Moreover, connection of the wireless network 113 to the internet allows communication with most any other remote computer including, for example, an internet (cloud)-connected server 52.

The communication system 101 may also permit communication over the wireless network with a gate receiver (see, e.g., wireless receiver(s) 222 in FIG. 3) as further described below. Although not specifically illustrated, the communication system 101 may further include conventional network hardware including gateways 250, routers, wireless access points, etc. (not shown).

While illustrated as using a centralized communication network (e.g., wherein each device connects to a central network), other embodiments may utilize a decentralized or ad-hoc network, wherein communication occurs directly between devices. For example, the mower may communicate directly with the wireless receiver 222 as further described below rather than communicate indirectly over the wireless network 113. Still further, while illustrated as primarily utilizing wireless communication protocols, such a configuration is not limiting as for example, various devices (e.g., the charging station 50 and/or the gateway 250) could connect to the communication network or other devices using wired connections without departing from the scope of this disclosure.

It will be readily apparent that the functionality of the machine controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the machine controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the machine controller 120 and/or processor 122 herein may be embodied as software, firmware, hardware, or any combination of these. Certain functionality of the machine controller 120 may also be performed in the "cloud" (e.g., at the server 52) or other distributed computing system operatively connected to the processor 122.

In FIG. 1, schematic connections are generally shown between the machine controller 120 and the battery 114, wheel motor(s) 104, cutting motor 112, optional boundary wire sensor 115, wireless radio 117, and GPS receiver 116. This interconnection is illustrative as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, and 133 are not shown, these sensors and other components of the mower 100 may be interconnected in a similar manner.

In some embodiments, various functionality of the machine controller 120 described herein may be offloaded from the mower 100. For example, recorded image data may be transmitted to a remote server (e.g., an internet-connected server 52) using the wireless radio 117 and then processed or stored. Alternatively, some functionality of the machine controller 120 may be provided by components on the charging station 50 and/or the remote computer 119.

The mower 100 may utilize the exemplary vision and navigation systems to permit autonomous operation of the mower within a given work region(s). For more information regarding exemplary operation and navigation of the mower 100, see U.S. Prov. Pat. App. No. 62/818,893.

In some embodiments, the mower 100 (see FIG. 2) includes a wireless transmitter or transceiver 202 (that may or may not be part of the wireless radio 117 (see FIG. 1)) that, along with the machine controller 120, forms part of an autonomous barrier passage system, embodiments of which are described below. For example, FIG. 3 illustrates an exemplary barrier passage system ("system") 200 configured to permit the working machine (mower 100) to cross a barrier defined by a fence 204 having a gate opening 207 formed therein. A gate 206 associated with the property barrier may selectively block the gate opening 207. That is, the gate 206 may be movable between a closed position, wherein a gate opening through the property barrier is selectively blocked by the gate, and an open position, wherein passage of the working machine through the gate opening 207 is permitted. The gate 206 may be a conventional, vertical hinge gate as is known in the art, e.g., a gate that may pivot between the closed position (wherein the gate opening 207 through the barrier (fence) is blocked by the gate as shown by the solid line gate in FIG. 3), and one or more open positions (one of which is shown by a broken representation of the gate 206 in FIG. 3).

The system 200 may include an actuator 208, e.g., an electric linear actuator, that is attached both to a fixed portion 212 (e.g., top edge) of the fence 204 and to an arm 214 attached to the gate 206. The actuator is adapted to move the gate between the closed position and the open position. That is, as the actuator extends and retracts, it causes the gate to pivot, about a vertical hinge axis 210, between the closed position and one or more open positions.

The actuator 208 (and gate controller 220 described below) may be connected to, and be powered by, either or both of an alternating current (AC) source or a direct current (DC) source. For example, the current source 216 may be a battery, solar cell, or a combination thereof. Alternatively, the current source could be a low voltage transformer 218 (which may be independent or part of another system (e.g., landscape lighting system, irrigation system, mower's own charging station)).

The system 200 may further include a gate controller 220 adapted to selectively energize the actuator (linear actuator 208) to control a position of the actuator and thus a position of the gate 206. That is, the gate controller 220 may command the actuator 208 to move the gate from the closed position, wherein passage of the working machine 100 through the gate opening 207 is blocked, to an open position, wherein passage of the working machine through the gate opening is permitted. The gate controller 220 may communicate with the machine controller 120 of the mower 100 (see FIG. 1) via any acceptable wireless protocol such that the gate can be automatically opened when the mower requests passage and closed once the mower has traversed the fence barrier.

For instance, in some embodiments the machine controller 120 is configured to (via the transceiver 202) wirelessly transmit a gate open signal 221 to the gate controller 220 (via the wireless receiver 222) as the mower approaches the gate. Such signal 221 may be infrared, acoustical, or radio frequency. The system 200 may include the wireless receiver(s) 222 adapted to receive the gate open signal 221 and communicate the same to the gate controller 220, wherein the gate open signal 221 effectively requests movement of the working machine through the gate opening. Upon receipt of the gate open signal, the gate controller 220 commands the actuator 208 to move the gate from the closed position to the open position. (e.g., extend or retract the actuator 208). The machine 100 may then propel autonomously through the gate opening 207 under control of the machine controller 120. In some embodiments, the system may also wirelessly transmit a gate close signal (again, see signal 221) from the machine controller 120 to the gate controller 220 after the working machine 100 has passed through the gate opening to effect closing of the gate 206.

The system 200 may be configured to minimize the time period that the gate 206 is open to reduce the opportunity for unknown objects 80 (e.g., pets and other animals) to also pass through the gate. In some embodiments, the mower 100 may monitor an area adjacent to the gate with the cameras (see, e.g., camera(s) 133 in FIG. 2) that operatively communicate with the machine controller 120. If during this monitoring an unknown object 80 such as a pet or other animal is detected within the area adjacent to the gate (detected using the camera and machine controller), the system 200 may delay movement of the gate to the open position based upon this detected presence of the unknown object. In other embodiments, the mower 100 (e.g., the machine controller 120) may communicate with the gateway 250 of the communication network (e.g., wireless network 113) such that the mower is effectively in communication with the associated remote computer 119 (e.g., a mobile phone) and other connected devices. As a result, when the mower approaches the gate 206, the mower may send an alert to the user (e.g., to the user's mobile phone) via the gateway 250 requesting that the gate be opened. In response, the user could remotely command the gate to open (again, via interaction with an application on the mobile phone) and allow passage of the mower through the gate opening. Alternatively, the gate could open automatically and provide a notification to the user of the same (e.g., a notification that the gate was opened and/or closed). Thus, in addition to direct communication between the mower 100 and the gate 206, some embodiments may provide indirect communication between these two components by allowing each to communicate directly over the communication network (e.g., wireless network 113).

To permit the system to detect unknown objects 80 such as pets or other animals, the system 200 (e.g., machine controller 120) may utilize computer vision algorithms and machine learning to recognize objects within digital images captured by the cameras 133 (see FIG. 2). As used herein, "object recognition" may be used to refer to various computer vision capabilities for identifying objects within a digital image. These computer vision capabilities may include algorithms for: image classification; object localization; object segmentation; and object detection.

In image classification, the system 200 may analyze an image and classify the image into one or more various categories (i.e., determining what is contained within the image). For example, image classification algorithms may classify an image as containing a human body or face, a dog, a tree, a fallen limb, etc. Object localization and segmentation may go a step further by, in addition to classifying the image, locating the detected object at a specific location within the image and delineating the same with a bounding box or, in the case of object segmentation, creating a pixel-by-pixel mask of the object. By iteratively applying classification and localization/segmentation algorithms to an image, object detection may yield a list of object classifications present in the image, as well as a bounding box or mask indicating the location and scale of each object.

As used herein, "unknown objects" refers to those objects within the work region (or within a local area of operation within the work region) detected by the machine controller 120 via the camera 133 (or by a remote camera), but for which the machine controller does not expect the mower 100 (e.g., based upon previous training) to encounter. Examples of unknown objects include but are not limited to humans, pets, wild animals, other yard vehicles, fallen branches, and debris. Unknown objects may include moving and/or stationary objects. The machine controller 120 may respond differently when encountering different unknown objects. For example, the machine controller 120 may be able to determine that the unknown object is an animal and cause different behavior than if the unknown object is determined to be something else such as a person.

The actuator 208 may include an encoder or other sensor adapted to generate a signal indicative of the position and movement direction of the actuator and provide the same to the gate controller 220. Alternatively, other sensors (e.g., proximity sensor) may be provided on the gate and/or the fence to provide a signal when the gate 206 is at certain locations (e.g., in the closed position). Once the mower has moved past the gate, the gate controller 220 may command the actuator 208 to close the gate. The determination of when to close the gate after mower passage may be based upon various factors. For instance, the gate could remain open for a period of time (e.g., a period of time that adequately allows the mower 100 to traverse the gate opening 207 and get clear of the closing gate), after which the system may return the gate, via the gate controller and the actuator, to the closed position. That is, the gate may be closed after expiration of a predetermined period of time from the time the gate was opened. Alternatively, the transceiver 202 may transmit a gate close signal to the wireless receiver 222 once the mower has cleared the gate. Regardless of the gate closing process, the gate 206 may be held in its closed position either by the actuator 208 itself, or via a latch (not shown). While not illustrated, other sensors may be provided to minimize or prevent contact with unknown objects during gate closure and opening by ensuring the area around the gate is clear before gate movement.

A benefit of the system 200 is that it allows an existing, conventional gate to be retrofitted with the necessary components, e.g., actuator 208, to allow remote and/or autonomous cooperation of the gate with the mower 100. However, such a configuration is not limiting. For instance, other embodiments may provide a dedicated (e.g., "mower only") gate such as the barrier passage system 300 illustrated in FIGS. 4 and 5. Like the system 200, the system 300 includes the mower 100 (or at least the machine controller 120 and transceiver 202) and a barrier (e.g., a fence 304) having a gate opening 307 formed therein, the opening selectively covered by a gate 306. However, the gate 306 may be configured as a dedicated portal (providing intended passage only for the mower 100) through the fence rather than a primary fence gate like the gate 206 of FIG. 3. While such dedicated gates have the disadvantage of requiring modification to the actual fence structure, they also permit the gate to be located at most any position along the fence barrier. Moreover, dedicated gates are potentially smaller and more discrete, and may have the added benefit of minimizing unintended animal passage when compared to conventional gate concepts like that of FIG. 3.

Figure 4:
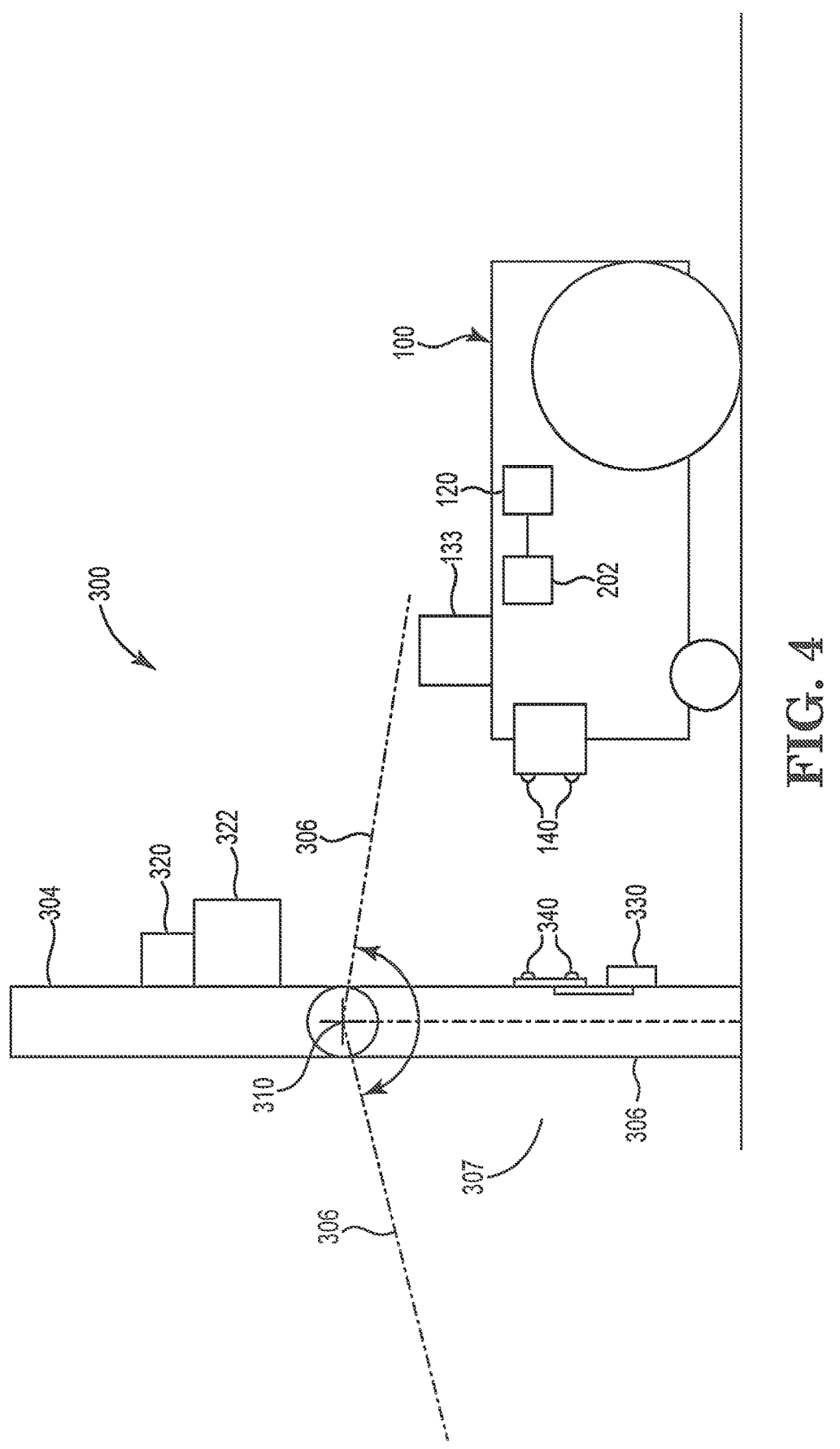
FIG. 4 is a side view of a barrier (e.g., fence) passage system in accordance with another embodiment of the present disclosure.
Figure 5:
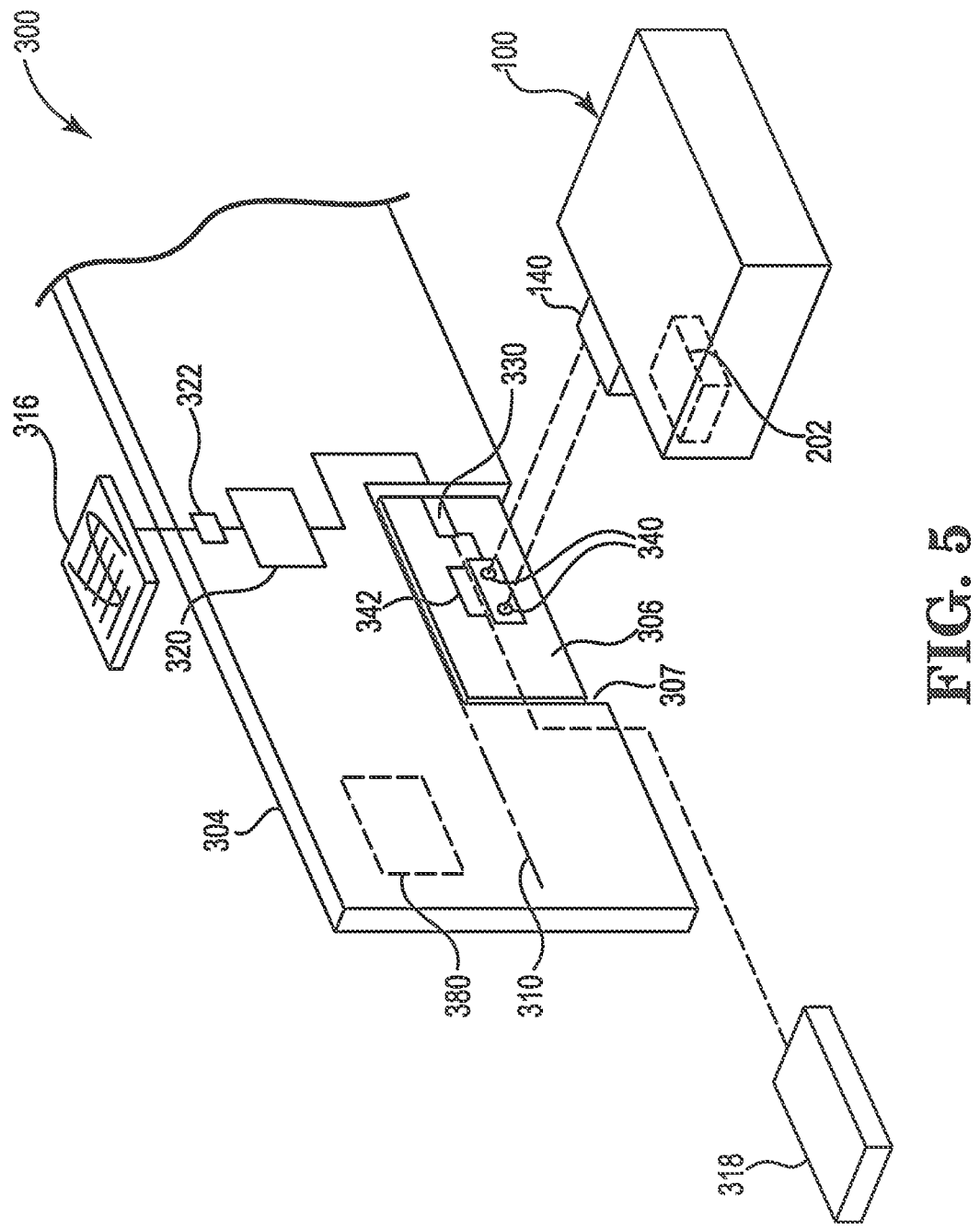
FIG. 5 is a perspective view of the system of FIG. 4.

As shown in FIGS. 4-5, the exemplary gate 306 may pivot bi-directionally about a horizontal hinge line 310 in a manner similar to a horizontally-mounted saloon-style door. The gate 306 may be biased to the closed position shown in FIG. 5 by biasing elements, or merely by gravity. The system 300 may further include a gate latch 330 (also referred to herein merely as "latch") operable to positively secure the gate 306 in the closed position. For example, in one embodiment, the latch 330 may be configured as a solenoid-operated pin secured to one of the fence and the gate. The pin may be retracted to unlatch and extended to latch the gate. The solenoid, which may be controlled by a gate controller 320, may be powered in a manner similar to the actuator 208 of the system 200, e.g., via a battery (not shown) or a solar cell 316, or via an AC or DC power supply 318.

As the mower 100 approaches the gate 306, the transceiver 202 (or other device(s) of the mower 100) may communicate (directly or indirectly) with a receiver 322 on the fence/gate, and a corresponding signal provided to the gate controller 320. The gate controller may then command the latch 330 to unlock (e.g., retract the pin). Once the latch is unlocked, the mower 100 may drive through the opening formed by the gate, using the propulsion force of the mower to manually displace the gate (see, e.g., broken line centerlines of gate 306 in open positions in FIG. 4) during passage. Alternatively, the gate 306 may include an actuator like the actuator 208 described above to move the gate from the closed position (see. FIG. 5) to an open position (see broken line gate centerline positions in FIG. 4), in which case the latch may be unnecessary.

As an alternative to the power sources described above, the system 300 could also utilize a power source located on the mower (e.g., the battery 114 of FIG. 1) to power the latch 330 and/or gate controller 320. That is, in some embodiments, the actuator and/or the gate controller are adapted to receive electrical power from the working machine itself. For instance, the mower 100 may include contacts 140 adapted to electrically communicate (abut) corresponding contacts on the charging station 50 (see FIG. 1) during a mower re-charging process. In the embodiments illustrated in FIGS. 4 and 5, the contacts 140 may also be used to engage contacts 340 on the gate 306 or fence 304. Once contact is made, the battery 114 (see FIG. 1) may charge a capacitor 342 or other energy storage device to a threshold level. Once that level is reached, the mower 100 may reverse, thus disengaging the contacts 140 from 340. With the capacitor charged, the mower may communicate as already described herein with the gate controller 320, allowing the latch to be disengaged as needed to permit passage of the mower. The gate controller 320 may command the solenoid to retract for a threshold time period, after which the pin may again extend. The time period may be selected to allow the mower to pass through the gate and for the door to return by gravity to equilibrium in its closed position. Alternatively, a sensor (not shown) may detect when the gate has returned to its closed position, after which the latch may engage.

Figure 6:
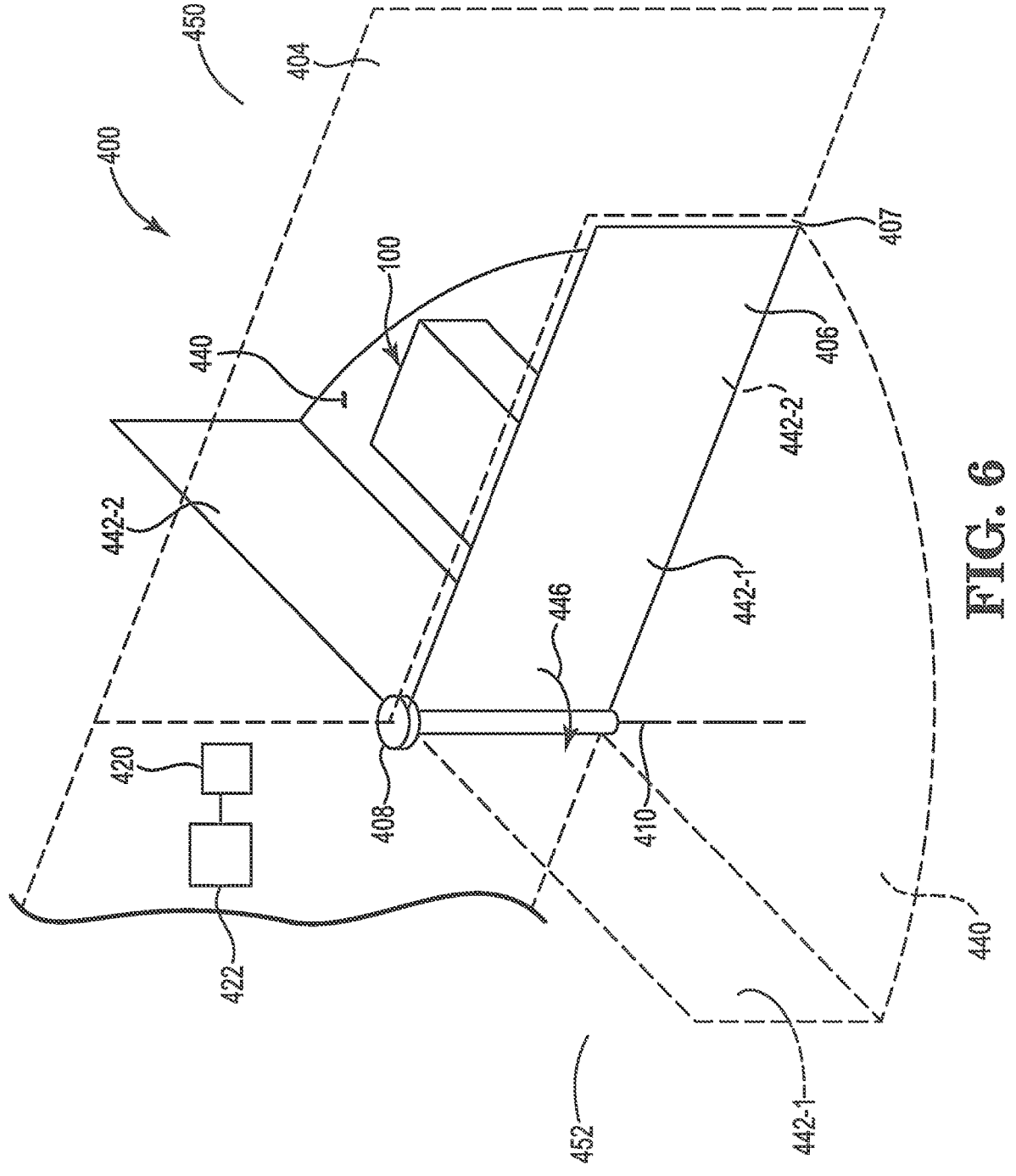
FIG. 6 is a perspective view of a barrier (e.g., fence) passage system in accordance with yet another embodiment of the present disclosure.

FIG. 6 illustrates a barrier (gate) passage system 400 in accordance with yet another embodiment of the disclosure. The barrier may again be formed by a fence 404 having a gate 406 that selectively opens and closes a gate opening 407. Like the gate 306, the gate 406 is a dedicated portal intended for mower-only passage. However, unlike the gates described elsewhere herein, the gate 406 is defined by a turntable formed by a floor sector or segment 440 and two upwardly extending walls 442. While shown as a 90-degree segment in the illustrated embodiments, such a construction is exemplary only. The segment may be bound by the two upwardly extending walls 442 (a wall 442-1 and wall 442-2), either of which may effectively form the actual gate as the turntable moves between a first position (shown in solid lines in FIG. 6) and a second position (rotated 90 degrees in the direction 446 about a pivot axis 410 as indicated in broken lines). The system 400 may, like the system 200, include an actuator (which may be a rotary actuator 408), gate controller 420, power source, receiver 422 and other components (not shown) as already described herein.

During operation, the mower 100 may approach the gate and park upon the surface of the floor segment 440. Again, the mower 100 (machine controller 120) may communicate with a receiver 422 associated with a gate controller 420 to indicate when the mower is in the appropriate position upon the turntable prior to passage through the fence 404. As shown in FIG. 6, the wall 442-1 may initially block the gate opening 407 when the mower 100 approaches the gate from a first side 450 of the gate 406/fence 404.

Once the mower 100 is so positioned, the gate controller 420 may command the actuator 408 to rotate, causing the turntable to rotate about the pivot axis 410. As the gate 406 rotates, the floor segment 440 of the turntable (and accordingly the mower 100) is repositioned to an opposite second side 452 of the fence 404. After rotation of 90 degrees, the wall 442-1 now extends to the second side 452 of the fence (on the opposite side of the fence from first side 450) and the wall 442-2 now closes the gate opening, minimizing ingress/egress of pets and other animals through the gate 406. The gate may then stay in the rotated position until the mower returns to the gate seeking passage back to the first side 450 of the fence. The mower 100 (machine controller 120) and/or the gate controller 420 may include logic that allows the gate to operate (rotate) without the mower in place if such rotation is needed (e.g., if the mower is approaching the gate from a side opposite the location of the floor segment 440, the gate may be commanded to first rotate in order to allow the mower to access the turntable). In some embodiments, the turntable may function as a charging station for the mower. In such a configuration, one or both of the walls 442 may include electrical contacts (see, e.g., contacts 340 in FIG. 4) that are operable to engage contacts (e.g., contacts 140) of the mower during re-charging.

Figure 7:
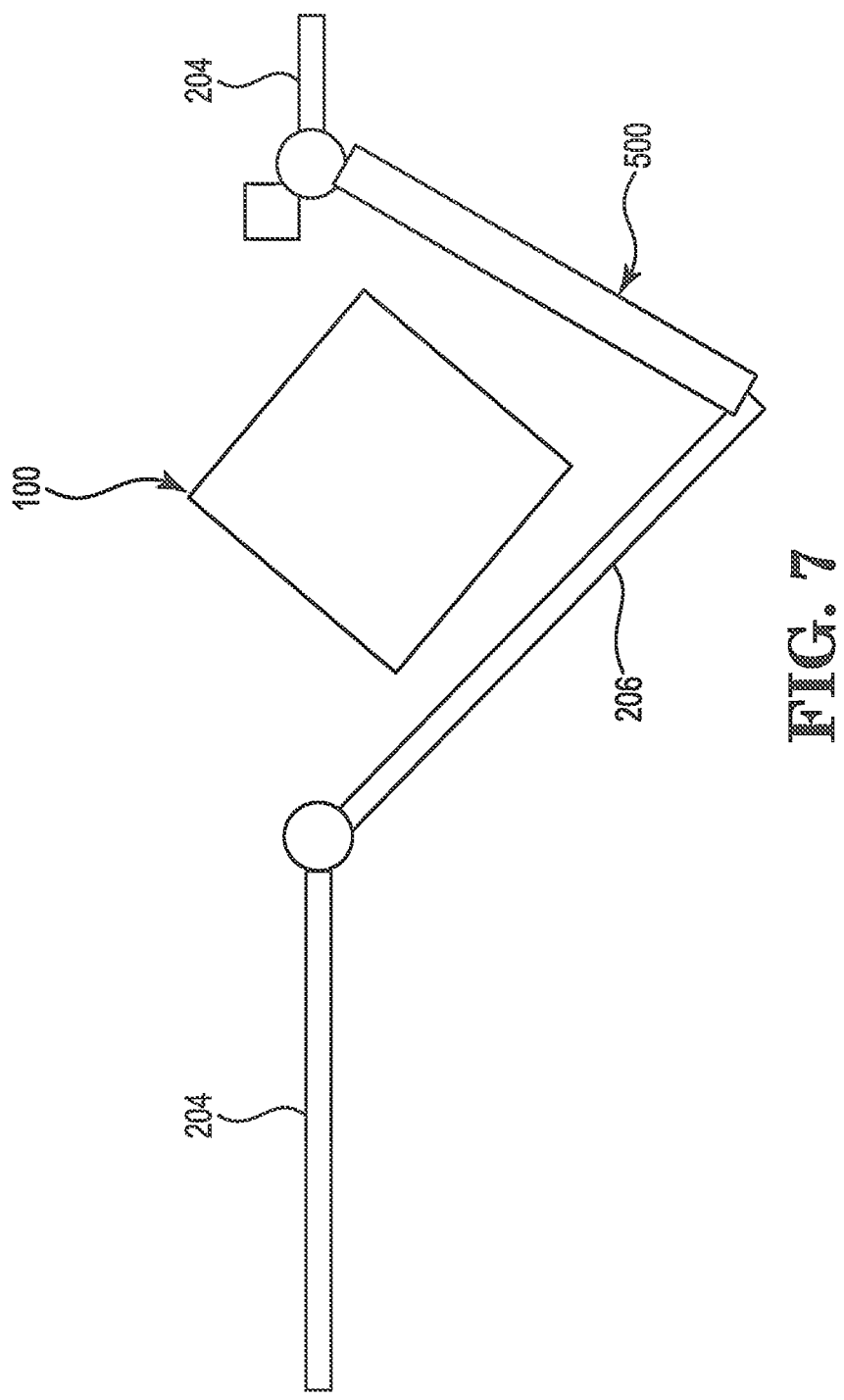
FIG. 7 is a top view of a barrier (e.g., fence) passage system in accordance with still yet another embodiment of the present disclosure.

FIG. 7 illustrates another embodiment of a barrier (gate) passage system 500 in accordance with embodiments of the present disclosure. As shown in this view, the system 500 may include a gate module (which may define a gate like the gate 306 or 406 described above) that may be positioned (temporarily or semi-permanently) between the fence 204 and a partially opened, existing gate 206 as shown. Such a construction would allow implementation of a gate passage system without requiring modification of original gate/fence structure.

Figures 8, 9:
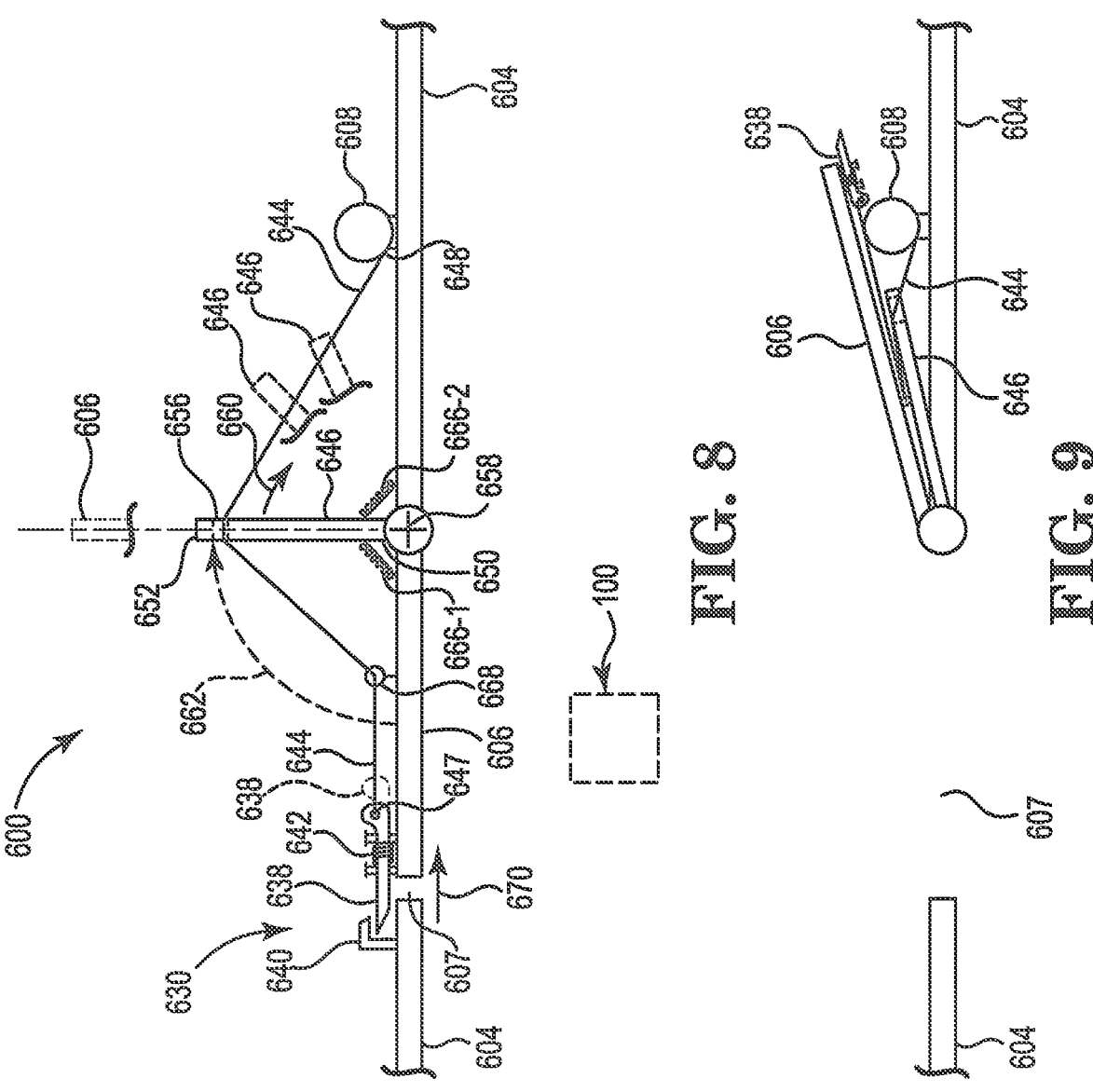
FIG. 8 is a top view of a barrier (e.g., fence) passage system in accordance with another embodiment of the present disclosure.
FIG. 9 is a top view similar to FIG. 8 showing a gate in an open position opened in excess of 90 degrees from its closed position.

FIG. 8 illustrates another barrier passage system 600 in accordance with embodiments of the present disclosure. As shown in this view, the system 600 may include a gate module including a fence 604 and a gate 606 configured to open and close to permit selective passage of the mower 100 through a gate opening 607. Like the gate 206, the gate 606 may be a conventional, vertical hinge gate that may pivot about a vertical hinge or pivot axis 658 between a closed position (shown in solid lines in FIG. 8) and one or more open positions (generally referred to as "open position" and represented by the partial dashed gate 606 in FIG. 8). In the open position, a gate opening 607 through the fence 604 is presented, allowing passage of the machine/mower 100 therethrough.

The gate 606 may include a gate latch 630 configured to releasably secure the gate 606 relative to the fence 604 in the closed position. The gate latch 630 may include a retractable pin 638 operatively attached to the gate and a receiver 640 operatively attached to the fence 604, wherein the retractable pin and latch may be aligned when the gate is in the closed position. As further described below, the retractable pin 638 may be retracted away from the receiver 640 to a retracted position to unlatch the gate and permit movement of the gate to the open position. Similarly, the retractable pin 638 may be extended toward the receiver 640 to an extended position as shown in FIG. 8 to latch the gate 606 in the closed position. The gate latch 630 may include a biasing member (e.g., spring 642) to bias the retractable pin 638 to the extended position. While the retractable pin 638 is shown attached to the gate 606 and the receiver 640 to the fence 604, such a configuration is exemplary only.

The system 600 may further include an actuator 608, which may be configured as an electric motor attached to the fence 604. An actuator cable 644 may be coupled to the actuator, wherein the actuator cable extends through an offset cable guide 646. The actuator cable 644 has a first end 647 coupled to the retractable pin 638 of the gate latch 630 and a second end 648 coupled to the actuator 608 so that the actuator is effectively coupled to the retractable pin. The actuator 608 may be employed to extend and retract the actuator cable 644 to pivot the gate 606 between the closed and open positions, respectively, as further described below. The system 600 may, like the system 200, include a gate controller, a power source, a receiver, and other components (not shown) as already described herein above.

The actuator cable 644 may extend through, or along, the cable guide 646, the latter being an elongate member operatively positioned between the actuator 608 and the gate latch 630. The exemplary cable guide 646 may include a proximal or first end 650 coupled to the fence/gate such that the cable guide may pivot about the vertical pivot axis 658. The cable guide 646 may further include an offset distal or second end 652. Located at or near the second end 652 is a hole or aperture 656 through which the actuator cable 644 may pass.

The cable guide 646 may pivot about the vertical pivot axis 658 from a first position (e.g., shown in solid lines in FIG. 8) wherein the cable guide is generally perpendicular to the fence 604), to a second position between perpendicular and parallel to the fence 604 (e.g., between 90 degrees to 0 degrees to the fence 604 as indicated by the alternative broken line representations of the cable guide 646 in FIG. 8, and in a gate fully open position as illustrated in FIG. 9), as indicated by direction 660, in response to retraction of the actuator cable 644 by the actuator 608. The cable guide 646 is thus adapted to provide an offset moment arm for the force applied by the actuator cable 644 to the gate 606. This offset permits the cable to pivot the gate 606 about the vertical hinge axis 658 as indicated by arrow 662. The cable guide 646 may be configured of any suitable material such as metal or polyvinyl chloride (PVC), and may be of cylindrical, rectangular, or most any other cross-sectional shape.

In some one embodiments, a pair of biasing mechanisms 666-1, 666-2 (e.g., springs) may be provided and adapted to act upon the cable guide 646. For example, the system 600 may include a first biasing mechanism 666-1 operatively positioned between the cable guide 646 and the gate 606, and a second biasing mechanism 666-2 operatively positioned between the cable guide and the fence 604. The pair of biasing mechanisms 666-1, 666-2 can apply biasing forces to the cable guide 646 (in opposing pivotal directions) about the vertical pivot axis 658. As a result, the biasing mechanisms 666-1, 666-2 can assist in the pivotal movement of both the cable guide 646 and the gate 606. For example, the biasing mechanisms 666-1, 666-2 may be configured to: bias the cable guide 646 to the first position (e.g., perpendicular to the fence 604 to provide the desired offset of the cable); and, correspondingly, the gate to the closed position.

The system 600 may also include one or more cable eyes 668 positioned between the cable guide 646 and the gate latch 630. The cable eye(s) 668 may serve as a guide(s) for the actuator cable 644 to permit effective manipulation of the gate latch 630. For instance, the cable eye 668 may be attached to the gate 606 between the retractable pin 638 and the vertical pivot axis 658 such that the actuator cable 644 extends generally parallel to the gate 606 between the retractable pin 638 and the cable eye 668. As a result, the actuator cable 644 may be optimally oriented for longitudinal movement of the retractable pin 638 (in the direction 670) in response to a force applied by the actuator cable 644.

The actuator 608 can initiate retraction of the actuator cable 644 in response to a gate open signal from the mower 100 to open the gate 606 (said signal received by the gate controller via a receiver as already described herein). As the actuator cable 644 is retracted, the retractable pin 638 of the gate latch 630 is slidably moved parallel to the gate 606 in response to the force applied by the cable to transition the retractable pin 638 from the extended position (illustrated in solid lines in FIG. 8) to the retracted position (illustrated in broken lines). As the actuator cable 644 continues to retract, the retractable pin 638 eventually "bottoms out" such that further retraction of the cable begins to pivot the gate 606 away from its closed position. As the cable retracts and the gate pivots, the cable guide 646 may pivot in the same direction (e.g., in the direction 660 toward the actuator 608) due to the force resulting from compression of the biasing mechanism 666-1. In some embodiments, the biasing mechanisms 666-1, 666-2 may seek to equalize their biasing forces, effectively causing the cable guide to extend from the vertical pivot axis 658 at an angle that is half-way between the fence 604 and the gate 606. For example, the cable guide 646 may be perpendicular to the fence 604 when the gate is in the closed position and extend at an angle of 45 degrees to the fence (see broken line rendering of the cable guide 646 in FIG. 8) when the gate opens 90 degrees from its closed position.

To close the gate 606, the actuator 608 may reverse directions and extend the actuator cable 644. As the actuator cable 644 extends, the biasing forces applied by the biasing mechanisms 666-1, 666-2 may assist in pivoting the cable guide 646 back to the first position and, correspondingly, the gate 606 back to the closed position. As the actuator cable 644 continues to extend, the cable releases the retractable pin 638 of the gate latch 630, whereby the biasing force applied by the spring 642 returns the retractable pin 638 to the extended position, effectively securing the gate in the closed position.

As stated above, while shown in the context of a fence barrier, embodiments of the present disclosure may find application to most any property barrier including, for example, building (garage, shed) ingress/egress. Moreover, while shown as manipulating a swinging gate of some kind to permit mower passage, other barrier passage systems may permit the mower to travel under (or over the fence) without departing from the scope of this disclosure. Moreover, a gate that translates upwardly, downwardly, or to a side to move to the open position is also contemplated.

Some properties may utilize multiple fences and/or multiple gates. In such cases, each gate may include a unique electronic signature or visual indicia (see, e.g., indicia 380 in FIG. 5) that the mower may recognize (e.g., via the cameras 133) to confirm that the mower 100 is at or near a specific gate.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A barrier passage system permitting an autonomous working machine to cross a barrier in or near a work region, the system comprising:

a gate associated with the barrier, the gate selectively movable between a first position, wherein passage of the autonomous working machine through the barrier is prohibited, and a second position, wherein passage of the autonomous working machine through the barrier is permitted;

an actuator adapted to move the gate between the first position and the second position;

a gate controller adapted to activate the actuator; and a machine controller in communication with the autonomous working machine, the machine controller adapted to autonomously control navigation of the autonomous working machine, wherein the machine controller is further configured to autonomously transmit a first signal to the gate controller, wherein upon receipt of the first signal, the gate controller activates the actuator to move the gate from the first position to the second position to allow the autonomous working machine to autonomously navigate through the barrier, and wherein the actuator and the gate controller are adapted to receive electrical power from the autonomous working machine.

2. The barrier passage system of claim 1, wherein the autonomous working machine comprises a working machine selected from the group comprising an outdoor working vehicle, an indoor working vehicle, a construction vehicle, a utility vehicle, an observation vehicle, and a transportation vehicle.

3. The barrier passage system of claim 1, wherein the autonomous working machine comprises a vehicle configured to modify or maintain an outdoor area.

4. The barrier passage system of claim 3, wherein the autonomous working machine further comprises a working tool configured to perform at least one of a mowing, blowing, vacuuming, aerating, dethatching, material spreading, snow removing, weeding, and watering function.

5. The barrier passage system of claim 1, wherein the autonomous working machine comprises a tool defining a grass-cutting element.

6. A barrier passage system permitting an autonomous working machine to cross a barrier between two work regions, the system comprising:

a gate associated with the barrier, the gate selectively movable between a first position, wherein a gate opening through the barrier is selectively blocked by the gate, and a second position, wherein passage of the autonomous working machine through the gate opening is permitted;

an actuator adapted to move the gate between the first position and the second position;

a gate controller adapted to activate the actuator; and a machine controller in communication with the working machine, wherein the machine controller is configured to autonomously transmit a first signal to the gate controller, wherein upon receipt of the first signal, the gate controller activates the actuator to move the gate from the first position to the second position to allow the autonomous working machine to autonomously navigate through the gate opening under control of the machine controller, and wherein the actuator and the gate controller are adapted to receive electrical power from the autonomous working machine.

7. The barrier passage system of claim 6, wherein the autonomous working machine comprises a working machine selected from the group comprising an outdoor working vehicle, an indoor working vehicle, a construction vehicle, a utility vehicle, an observation vehicle, and a transportation vehicle.

8. The barrier passage system of claim 6, wherein the autonomous working machine comprises a vehicle configured to modify or maintain an outdoor area.

9. The barrier passage system of claim 8, wherein the autonomous working machine further comprises a working tool configured to perform at least one of a mowing, blowing, vacuuming, aerating, dethatching, material spreading, snow removing, weeding, and watering function.

10. The barrier passage system of claim 6, wherein the autonomous working machine comprises a tool defining a grass-cutting element.

* * * * *